(12) United States Patent
Mamaliga

(10) Patent No.: US 12,409,720 B1
(45) Date of Patent: Sep. 9, 2025

(54) CONTINUOUS TORQUE TRANSMISSION SYSTEM

(71) Applicant: Nicu Mamaliga, Pingree Grove, IL (US)

(72) Inventor: Nicu Mamaliga, Pingree Grove, IL (US)

( * ) Notice: Subject to any disclaimer, the term of this patent is extended or adjusted under 35 U.S.C. 154(b) by 0 days.

(21) Appl. No.: 18/784,826

(22) Filed: Jul. 25, 2024

(51) Int. Cl.
| | |
|---|---|
| *B60K 6/365* | (2007.10) |
| *B60K 6/40* | (2007.10) |
| *B60K 6/46* | (2007.10) |
| *F16H 37/04* | (2006.01) |
| *H02K 7/116* | (2006.01) |

(52) U.S. Cl.
CPC .......... *B60K 6/365* (2013.01); *B60K 6/40* (2013.01); *B60K 6/46* (2013.01); *F16H 37/041* (2013.01); *H02K 7/116* (2013.01); *B60Y 2200/92* (2013.01)

(58) Field of Classification Search
CPC ....... H02K 7/116; F16H 37/041; B60K 6/365; B60K 6/40; B60K 6/46
See application file for complete search history.

(56) References Cited

U.S. PATENT DOCUMENTS

2008/0039258 A1 * 2/2008 Usoro .................... B60K 6/445
475/5

FOREIGN PATENT DOCUMENTS

| DE | 102022119554 A1 * | 2/2024 | ............. B60K 7/00 |
| JP | 7501902 B2 * | 6/2024 | ............. H02K 7/116 |

* cited by examiner

*Primary Examiner* — Tisha D Lewis
(74) *Attorney, Agent, or Firm* — AU LLC; Adam E. Urbanczyk

(57) ABSTRACT

A Continuous Torque Transmission (CTT) system that includes a first planetary gear assembly, a first electric motor-generator, a control module, a second electric motor-generator, and a third electric motor-generator. The first electric motor-generator includes a first stator and a first rotor. The second electric motor-generator includes a second stator and a second rotor, and the third electric motor-generator includes a third stator and a third rotor. A rectifier is electrically coupled to a control module and is configured to receive alternating current (AC) and convert it into direct current (DC). The control module may configure the CTT system in an acceleration mode or a deceleration mode, via a mode switch. In the acceleration mode, the first stator acts as a generator. In the deceleration mode, the third stator acts as a generator.

17 Claims, 4 Drawing Sheets

CONTINUOUS TORQUE TRANSMISSION SYSTEM

BACKGROUND

Field of the Invention

The present invention relates, generally, to hybrid transmission systems, and more particularly to a Continuous Torque Transmission (CTT) system for a vehicle for selectively combining mechanical and electrical power.

Description of the Prior Art

The development of systems to combine mechanical and electrical power dates back to the early $20^{th}$ century with the advent of hybrid technologies. Initially, these systems were rudimentary, involving basic methods to switch between mechanical and electrical drives. Over time, advancements in electronics, materials science, and control systems have led to more sophisticated and efficient solutions. Traditional hybrid power transmission systems often suffer from inefficiencies when switching between or combining mechanical and electrical power sources. These inefficiencies can lead to energy losses, reduced performance, and increased wear and tear on system components. The challenge lies in developing a system that can continuously and smoothly combine these power sources to deliver optimal torque and power without interruption or significant energy loss.

One of the conventional hybrid systems for power transmission in vehicles is the 'parallel hybrid system' in which both an internal combustion engine (mechanical) and an electric motor (electrical) drive the vehicle's wheels. However, switching between these power sources can cause interruptions and inefficiencies. Another conventional hybrid system called 'series hybrid system' uses an electric motor to drive the wheels, with an internal combustion engine generating electricity to power the motor. While this reduces the mechanical complexity, it can still result in energy conversion losses.

There is, therefore, a need for solutions that enable the smooth and continuous blending of mechanical and electrical power sources, ensuring no interruptions in power delivery, maximize the efficiency of power transmission by reducing energy losses associated with switching and combining power sources, and increase the overall performance of the system by optimizing the torque delivery and maintaining consistent power output.

SUMMARY

In one aspect, a Continuous Torque Transmission (CTT) system is disclosed. The CTT system may include a first planetary gear assembly that may include a first ring gear attached to an input shaft rotating at a consistent speed, a first sun gear attached to a first rotor, and a set of first planet gears, each engaging with the first ring gear and the first sun gear. The CTT system may further include a first electric motor-generator that may include a first stator attached to the set of first planet gears and a first rotor electromagnetically coupled with the first stator. The CTT system may further include a control module electrically connected to the first stator and the set of first planet gears. Further, the CTT system may include a second electric motor-generator that may further include a second stator connected to the set of first planet gears, the first stator, and the control module and a second rotor electromagnetically coupled with the second stator. The CTT system may further include a third electric motor-generator that may further include a third stator and a third rotor. The third stator may be connected to the set of first planet gears, the first stator, the control module, and the second stator. The set of first planet gears, the first stator, the control module, the second stator, and the third stator may be coupled to an output shaft. The CTT system may further include a third rotor configured to electromagnetically coupled with the third stator, and a rectifier electrically coupled to control module and the configured to receive alternating current (AC) and convert into direct current (DC). The control module may configure the CTT system in one of an acceleration mode and a deceleration mode, via the mode switch. In the acceleration mode, the first stator may act as a generator to generate electric power that is supplied to the rectifier. In the deceleration mode, the third stator may act as a generator to supply electric power to the rectifier. The rectifier may supply electric power to the first stator that acts as a motor to maintain a constant speed of the input shaft during the deceleration of the output shaft.

In an embodiment, the second rotor may be fixed to a housing associated with the CTT system to fix rotation of the second rotor.

In an embodiment, the CTT system may further include a second planetary gear assembly that may include a second ring gear attached to the set of first planet gears, the first stator, the control module, the second stator, and the third stator, and coupled to the output shaft. Further, the CTT system may include a second sun gear attached to the third rotor and a set of second planet gears, each engaging with the second ring gear and the first sun gear.

In an embodiment, the set of second planet gears may be attached to a shaft, such that the shaft may be adapted to rotate in one direction.

In an embodiment, the CTT system may further include a first spur gear attached to the second ring gear, such that the first spur gear may be further coupled to an output shaft. Further, the first spur gear may be coupled to the output shaft. A second spur gear and a third spur gear may be attached to a common connecting shaft. A fourth spur gear may be attached to the output shaft, such that the fourth spur gear is offset from the second and the third spur gear and engaging with the third spur gear.

In an embodiment, when the output shaft is stationary: the rotation of the input shaft may cause the rotation of the first sun gear via the first ring gear and the set of first planet gears, to induce maximum voltage in the first stator; revolution of the set of first planet gears may be constrained; and the control module ceases the supply of electrical power to the second stator or the third stator.

In an embodiment, when the output shaft is in the acceleration mode from being stationary: for a high torque application, the control module may direct electrical power to the third stator; or for a low torque application, the control module may direct electrical power to the second stator.

In an embodiment, when the output shaft rotates at a medium speed range: the torque generated at the output shaft may be partly from the input shaft and partly from one of the second stator and the third stator.

In an embodiment, when the output shaft rotates at a high-speed range: the first sun gear may rotate at a lower speed; the first rotor rotating at the lower speed may induce a low voltage in the first stator; and the control module may cause the supply of electrical power to one of the second stator and the third stator.

In an embodiment, when the output shaft rotates at the high-speed range and is in the deceleration mode, the output shaft may rotate the third stator and the second stator, and the control module may cause the supply of electrical power to the first stator.

In an embodiment, the control module may include a mode switch configured to switch the CTT system between the acceleration mode and the deceleration mode, based on an instruction.

In an embodiment, the control module may further include a receiver configured to wirelessly receive the instruction and transmit the instruction to the mode switch.

In an embodiment, the CTT system may further include a voltage regulator coupled to the control module. The voltage regulator may be configured to receive electricity supply from the rectifier and regulate the voltage of electricity supplied to the control module.

In an embodiment, the control module may include a first motor controller configured to receive electrical power from the voltage regulator and the instruction from the receiver, to control the third stator in the acceleration mode, or control the first stator in the deceleration mode. The control module may further include a second motor controller configured to receive electrical power from the voltage regulator and the instruction from the receiver, to control the second stator.

In an embodiment, in the acceleration mode, the first motor controller may be coupled with the third stator, and the second motor controller may be connected with the second stator. In the deceleration mode, the first stator may be coupled with the first motor controller.

DETAILED DESCRIPTION

Figure 1:
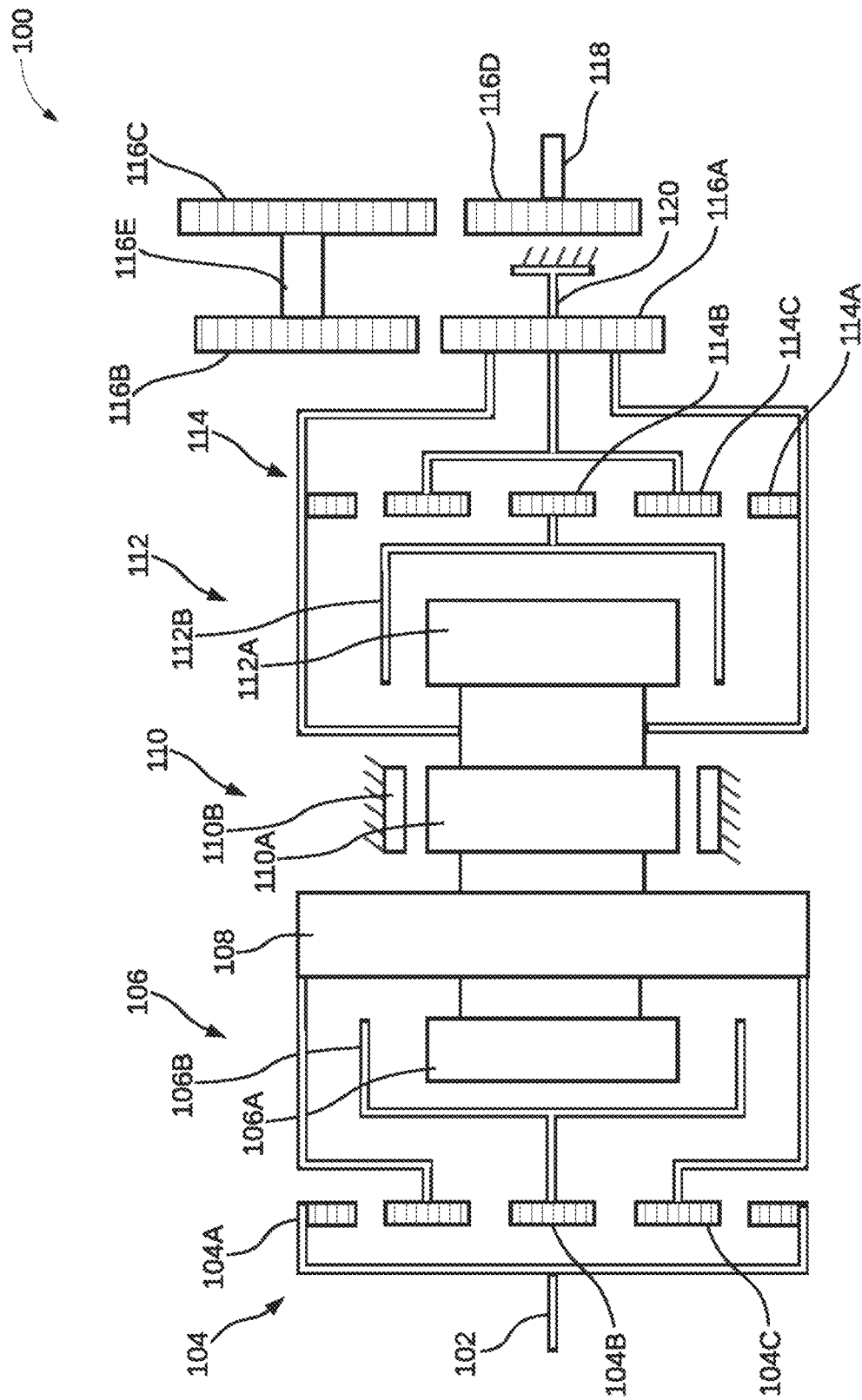
FIG. 1 illustrates a schematic diagram of a Continuous Torque Transmission (CTT) system, according to an example embodiment of the disclosure.

Referring to FIG. 1, a schematic diagram of a Continuous Torque Transmission (CTT) system 100 is illustrated, according to an example embodiment of the disclosure. The CTT system 100 may be implemented, for example, in a vehicle with an internal combustion engine, and provides for an efficient combining of electrical and mechanical power towards torque transmission.

The CTT system 100 may include a first planetary gear assembly 104, a first electric motor-generator 106, a control module 108, a second electric motor-generator 110, a third electric motor-generator 112, and a rectifier. The CTT system 100 may be coupled with an input shaft 102 via the first planetary gear assembly 104. In particular, the first planetary gear assembly 104 may include a first ring gear 104A that may be coupled to the input shaft 102. The input shaft 102 may supply mechanical power and rotate at a consistent speed. The first planetary gear assembly 104 may further include a first sun gear 104B and a set of first planet gears 104C. As shown in FIG. 1, the first ring gear 104A may engage with the set of first planet gears 104C, and the set of first planet gears 104C may further engage with the first sun gear 104B. The set of first planet gears 104C may include a plurality of gears planet gears, i.e., two or more planet gears.

The first electric motor-generator 106 may include a first stator 106A and a first rotor 106B. The first electric motor-generator 106 may be implemented as an electromechanical device that can function both as a motor, converting electrical energy into mechanical energy, and as a generator, converting mechanical energy into electrical energy. The first stator 106A may be the stationary part of the first electric motor-generator 106, and may generate a magnetic field which interacts with the first rotor 106B. The first stator 106A may include windings or permanent magnets mounted on a laminated iron core. Further, the first stator 106A may be have winding configurations corresponding to three-phase or single-phase configuration. The first rotor 106B may be the rotating part of the first electric motor-generator 106 and may rotate due to the interaction with the magnetic field generated by the first stator 106A. The first rotor 106B may be made of coils of wire (wound rotor) or a solid metal (squirrel-cage rotor) encased in laminations to reduce energy loss, or permanent magnets in a specific order and number depending on stator 106A configuration. For example, the first rotor 106B may be a wound rotor or an induction (squirrel-cage) rotor or a permanent magnet assembly held together by a solid structure. As will be further appreciated by those skilled in the art, when operating as a motor, electrical energy is supplied to the windings of the first stator 106A, creating a rotating magnetic field. This field induces a current in the rotor, causing it to spin and produce mechanical motion. When functioning as a generator, mechanical energy rotates the first rotor 106B within the magnetic field, inducing an electric current in the windings of the first stator 106A, thus generating electricity.

The first rotor 106B of the first electric motor-generator 106 may be attached to the first sun gear 104B of the first planetary gear assembly 104. Further, the first stator 106A may be attached to the set of first planet gears 104C. Furthermore, as mentioned above, the first rotor 106B may be electromagnetically coupled with the first stator 106A.

The control module 108 may be electrically and physically connected to the first stator 106A and the set of first planet gears 104C. Further, the control module 108 may be free to rotate with the first planet gears 104C and first stator 106A.

The second electric motor-generator 110 may include a second stator 110A and a second rotor 110B. Similar to the first electric motor-generator 106, the second electric motor-generator 110 may also be implemented as an electromechanical device that can function both as a motor and as a generator. The second rotor 110B may be the rotating part and may rotate due to the interaction with the magnetic field generated by the second stator 110A. As such, when operating as a motor, electrical energy is supplied to the windings of the second stator 110A, creating a rotating magnetic field that induces a current in the second rotor 110B, causing it to spin and produce mechanical motion. When functioning as a generator, mechanical energy rotates the second rotor 110B within the magnetic field, inducing an electric current in the windings of the second stator 110A, thus generating electricity.

In an embodiment, the second rotor 110B may be fixed to a housing associated with the CTT system 100. As such, the rotation of the second rotor 110B may be fixed. Further, the second stator 110A may be connected to each of the set of first planet gears 104C, the first stator 106A, and the control module 108. In other words, the second stator 110A, the set of first planet gears 104C, the first stator 106A, and the control module 108 may be attached to each other. Furthermore, as mentioned above, the second rotor 110B may be electromagnetically coupled with the second stator 110A.

The third electric motor-generator 112 may include a third stator 112A and a third rotor 112B. Similar to the first electric motor-generator 106 and the second electric motor-generator 110, the third electric motor-generator 112 may also be implemented as an electromechanical device that can function both as a motor and as a generator. The third rotor 112B may be the rotating part and may rotate due to the interaction with the magnetic field generated by the third stator 112A. As such, when operating as a motor, electrical energy is supplied to the windings of the third stator 112A, creating a rotating magnetic field that induces a current in the third rotor 112B, causing it to spin and produce mechanical motion. When functioning as a generator, mechanical energy rotates the third rotor 112B within the magnetic field, inducing an electric current in the windings of the third stator 112A, thus generating electricity.

In some embodiments, each of the first electric motor-generator 106, the second electric motor-generator 110, and the third electric motor-generator 112 may be a brushless motor, and therefore, may require three electrical wires to power them.

The third stator 112A may be connected to the set of first planet gears 104C, the first stator 106A, the control module 108, and the second stator 110A. As such, the third stator 112A, the set of first planet gears 104C, the first stator 106A, the control module 108, and the second stator 110A may be connected to each other. Further, the set of first planet gears 104C, the first stator 106A, the control module 108, the second stator 110A, and the third stator 112A may be coupled to an output shaft 118. Furthermore, as mentioned above, the third rotor 112B may be electromagnetically coupled with the third stator 112A.

The rectifier (not shown in FIG. 1; refer FIGS. 2A-2B) may be electrically coupled to the control module 108. The rectifier may be configured to receive alternating current (AC) from an AC supply and convert it into direct current (DC). The rectifier may be a half-wave type rectifier or full-wave type rectifier. The half-wave type rectifier may convert only one half of the AC cycle to DC, and may use a single diode. The full-wave type rectifier may convert both halves of the AC cycle to DC, and have higher efficiency.

The control module 108 may configure the CTT system 100 in an acceleration mode and or a deceleration mode. In the acceleration mode, the first stator 106A may act as a generator to generate electric power. The generated electric power may be supplied to the rectifier (for example, a 3-phase bridge rectifier). In other words, when the output shaft is accelerating (for example, when the vehicle starts to move from being stationary), the first stator 106A (i.e. the first electric motor-generator 106) may act as generator to generate electric power. As such, the first rotor 106B is rotated by the mechanical power from the input shaft 102, to thereby configure the first electric motor-generator 106 as generator to generate electrical power. The rectifier may convert the alternating current (AC) into direct current (DC) that may be supplied to a voltage regulator (not shown in FIG. 1; refer FIGS. 2A-2B). The voltage regulator may bring the current to a constant voltage and send the current to a first motor controller and a second motor controller. Further, depending on a signal from a receiver, power may be sent to the second stator 110A or the third stator 112A. In particular, the power may be sent to the second stator 110A for low torque demand, and to the third stator 112A for high torque demand.

During the deceleration mode, energy may be supplied to the CTT system 100 of the vehicle via the output shaft 118. The energy may later be provided to the engine via the input shaft 102. The mode switch (not shown in FIG. 1, refer FIGS. 2A-2B) may switch terminals. In the deceleration mode, the third stator 112A may act as a generator to supply electric power to the rectifier. The rectifier may in turn supply the generated electric power to the first stator 106A. In other words, when the output shaft is decelerating (for example, during braking of the vehicle), the third stator 112A (i.e. the third electric motor-generator 112) may act as generator to generate electric power. As such, the third rotor 112B is rotated by the mechanical power from the output shaft 118, to thereby configure the third electric motor-generator 112 as generator to generate electrical power. Further, in the deceleration mode, the first stator 106A may act as a motor. Therefore, the first stator 106A is supplied electrical power to cause rotation of the first rotor 106B. As a result, a constant speed of the input shaft 104 is maintained during the deceleration of the output shaft 118. The current generated from the third stator may enter the rectifier, then to the voltage regulator, and finally to the first motor controller. The first motor controller, with the help of the receiver may power the first stator 106A so as to maintain a gear ratio that allows the input shaft 102 to run at a constant speed, even when the output shaft 118 is slowing down.

In an embodiment, the CTT system 100 may further include a second planetary gear assembly 114. In particular, the third stator 112A of the third electric motor-generator 112 may be coupled with the output shaft 118 via the second planetary gear assembly 114. The second planetary gear assembly 114 may include a second ring gear 114A that may be attached to the set of first planet gears 104C, the first stator 106A, the control module 108, the second stator 110A, and the third stator 112A. Further, the second ring gear 114A may be coupled to the output shaft 118. The second planetary gear assembly 114 may further include a second sun gear 114B that may be attached to the third rotor 112B. Further, the second planetary gear assembly 114 may include a set of second planet gears 114C, each of which may engage with the second ring gear 114A and the first sun gear 104B.

In an embodiment, the set of second planet gears 114C may be attached to a connecting shaft 120, such that the connecting shaft 120 is configured to rotate in one direction. In other words, the connecting shaft 120 may be coupled to a one-direction mechanism that allows rotation of the connecting shaft 120 and hence the set of second planet gears 114C only in direction and restricts the rotation in the opposite direction.

The CTT system 100 may further include a gear assembly 116 that may couple the second ring gear 114A to the output shaft 118. As shown in FIG. 1, the gear assembly 116 may include a first spur gear 116A that may be attached to the second ring gear 114A. The first spur gear 116A may be further coupled to an output shaft 118. In particular, the gear assembly 116 may further include a second spur gear 116B, a third spur gear 116C, and a fourth spur gear 116D. The second spur gear 116B and the third spur gear 116C may be attached to a common connecting shaft 116E. The fourth spur gear 116D may engage with the third spur gear 116C. Further, the fourth spur gear 116D may be attached to the output shaft 118. As shown in FIG. 1, the fourth spur gear 116D may be offset from the second spur gear 116B and the third spur gear 116C.

Therefore, it should be noted that the set of first planet gears 104C may be solidly mounted to the first stator 106A, the control module 108, the second stator 110A, and the third stator 112A, the second ring gear 114A and the first spur gear 116A. In particular, the input shaft 102 may be solidly mounted to the first ring gear 104A. the first sun gear may be solidly mounted to the first rotor 106B. The second sun gear 114B may be solidly mounted to the third rotor 112B. The second spur gear 116B and the third spur gear 116C may be solidly mounted on the same shaft 116E and therefore spin at the same speed. The fourth spur gear 116D may be solidly mounted to the output shaft 118. The set of first planet gears 104C may be connected to the output shaft 118 via the first spur gear 116A, the second spur gear 116B, the third spur gear 116C, and the fourth spur gear 116D. As such, the speed of the set of first planet gears 104C may be proportional to the speed of the output shaft 118. Further, the speed ratio between the first planet gears 104C and the output shaft 118 may depend on the gear ratio of the first spur gear 116A through the fourth spur gear 116D.

When Output Shaft is Stationary

During operation of the CTT system 100, when the output shaft 118 is stationary: the rotation of the input shaft 102 may cause the rotation of the first sun gear 104B via the first ring gear 104A and the set of first planet gears 104C, to induce maximum voltage in the first stator 106A. Further, when the output shaft 118 is stationary, revolution of the set of first planet gears 104C may be constrained. Furthermore, the control module 108 may cease the supply of electrical power to the second stator 110A or the third stator 112A.

For example, when the vehicle and the output shaft 118 are stationary and the engine of the vehicle is running at 2000 RPM and hence the input shaft 102 is running at 2000 revolutions per minute (RPM), the first ring gear 104A may also rotate at 2000 RPM. Since the speed of the output shaft 118 is 0, the speed of the set of first planet gears 104C is also 0. As a result, in the current scenario, the first sun gear 104B may be rotating at a maximum speed. For example, in a case scenario, a gear ratio between the first ring gear 104A and the first sun gear 104B is 4; therefore, the speed of the first sun gear 104B and the first rotor106B will be 8000 RPM. This may induce maximum voltage in the first stator 106A, for the control module 108 to operate the transmission. The control module 108 may decrease the voltage to operate one of the second stator 110A or the third stator 112A. As soon as the vehicle starts driving, a signal may be transmitted (e.g. wirelessly) to the control module 108 which may then send electrical power to the third stator 112A for high torque applications, or to the second stator 110A for low torque applications.

When Output Shaft is Acceleration Mode from being Stationary (i.e. Vehicle Starts Driving)

When the output shaft 118 is in the acceleration mode from being stationary (for example, when the vehicle started moving from being stationary), for a high torque application, the control module 108 may direct electrical power to the third stator 112A. As will be understood, a high torque is required to move the vehicle from a stationary condition. Therefore, in such a scenario, the control module 108 may engage the third stator 112A by directing electrical power to the third stator 112A. It should be noted that while the third stator 112A is suitable for high torque applications, the second stator 110A may be more suitable for low torque applications. A such, for a low torque application (for example, when the vehicle is already moving), the control module 108 may direct electrical power to the second stator 110A.

When Output Shaft is Rotating at Medium Speed Range

In an embodiment, when the output shaft 118 is rotating at a medium speed range (for example, when the vehicle is moving at a medium speed), the torque generated at the output shaft 118 may be partly derived from the input shaft 102 and partly from one of the second stator 110A and the third stator 112A. In other words, in the medium speed range scenario, the output shaft 118 may be rotated by power delivered by a combination of the input shaft 102 (i.e. mechanical power from the engine) and power generated by one of the second stator 110A and the third stator 112A (i.e. using electricity).

For example, when the engine speed and hence speed of the input shaft 102 is 2000 RPM, the first ring gear rotates at 2000 RPM. Further, since the set of first planet gears 104C is rotating at medium RPM, speed of the first sun gear 104B is also in medium range. In such a situation, half of the torque being supplied to the output shaft 118 is from the mechanical side (i.e. the vehicle engine via the input shaft 102) and half from the electrical side (i.e. the second electric motor-generator 110 or the third electric motor-generator 112).

When Output Shaft is Rotating at High-Speed Range (No Deceleration)

When the output shaft 118 is rotating at a high-speed range and there is no deceleration, the first sun gear 104B may rotate at a lower speed. Correspondingly, the first rotor 106B may rotate at a lower speed. As such, the first rotor 106B, rotating at lower speed, may induce a low voltage in the first stator 106A. Further, the control module 108 may cause the supply of electrical power to one of the second stator 110A and the third stator 112A. Therefore, depending on low or high torque requirement, the control module 108 may supply electrical power to the second stator 110A or the third stator 112A, respectively. As such, one of the second stator 110A and the third stator 112A may generate power using electricity and supply to the output shaft 118 to facilitate rotation at the high speed range.

For example, when the vehicle speed is high and the engine speed (and hence speed of input shaft 102) is 2000 RPM, the speed of the set of first planet gears 104C is close to the speed of the first ring gear 104A. As a result, the first sun gear 104B rotates in a low speed range. The first rotor 106B rotates at low speed, inducing low voltage in the first stator 106A. The control module 108 may increase the voltage to operate the second stator 110A or the third stator 112A. In such a scenario, most of the torque to the output shaft 110 is transmitted mechanically, i.e. from the input shaft 102, as this is the most efficient way to transmit power.

When Output Shaft Rotates at the High-Speed Range (and is in Deceleration Mode)

When the output shaft 118 is rotating at the high-speed range and is in the deceleration mode, the output shaft 118 may rotate the third stator 112A and the second stator 110A. As the output shaft 118 is decelerating, the power from the output shaft 118 may be used to generate electrical power via the third stator 112A and the second stator 110A. The generated electricity may be supplied to the first stator 106A, by the control module 108. The rotation of the first stator 106A may therefore be transferred to the input shaft 102 that may, for example, cause to charge a battery.

In the above scenario (i.e. when the vehicle is running at high speed range and is decelerating), for example, when the engine speed (and hence speed of input shaft 102) is 2000 RPM, the vehicle can be decelerated using the engine of the vehicle. The power coming in through the output shaft 118 may drive the second electric motor-generator 110 and the third electric motor-generator 112. The power obtained by the control module 108 may be converted and used to drive the first electric motor-generator 106, to maintain a gear ratio that allow the engine to run at constant RPM while the vehicle decelerates.

As mentioned above, the CTT system 100 may include the rectifier and the voltage regulator. In addition, the CTT system 100 may include a mode switch, a receiver, a first motor controller, and a second motor controller. These components are explained in detail, in conjunction with FIGS. 2A-2B.

Figure 2A:
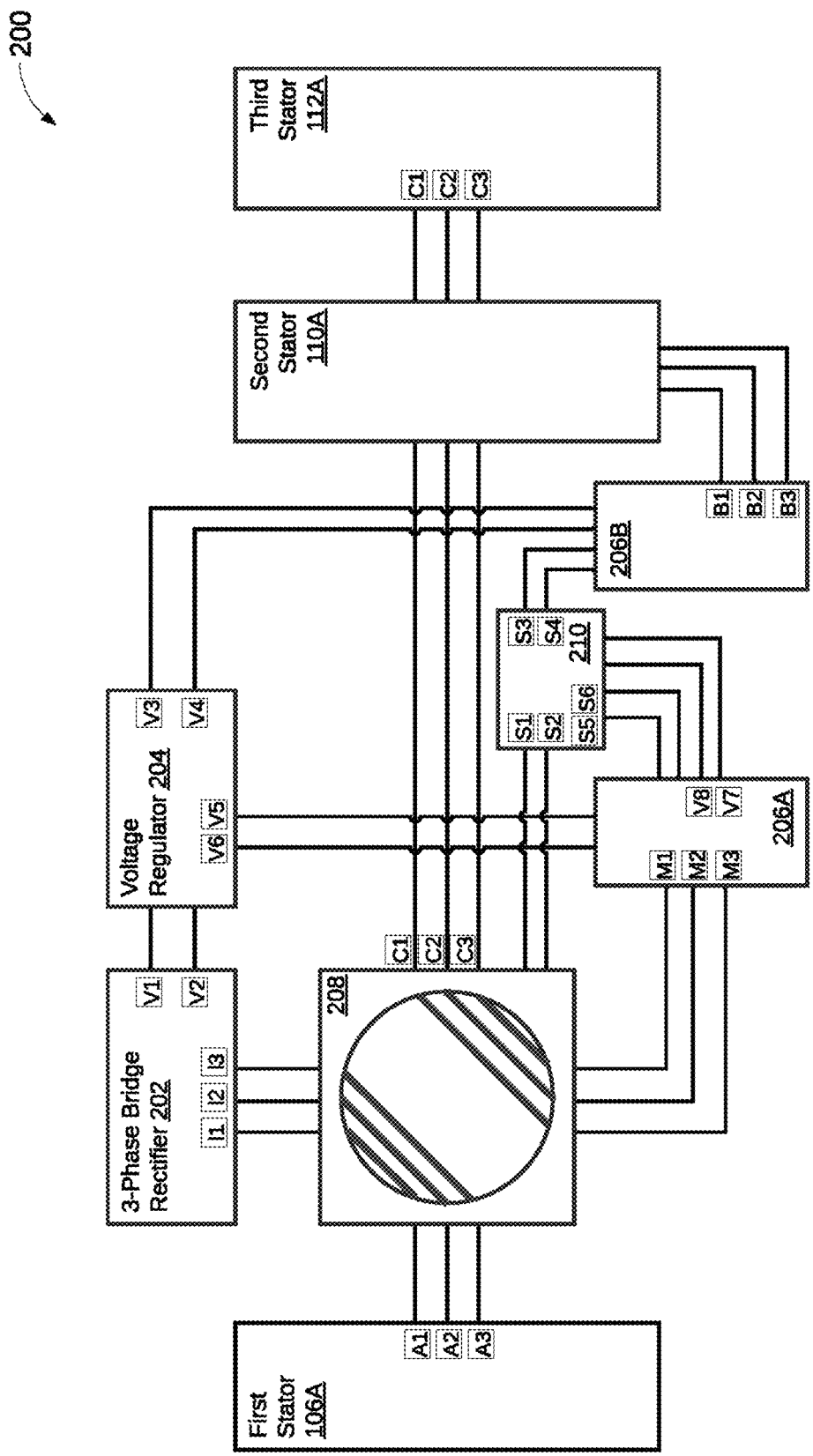
FIG. 2A illustrates another schematic diagram of the CTT system with a mode switch configured in a first configuration, according to an example embodiment of the disclosure.
Figure 2B:
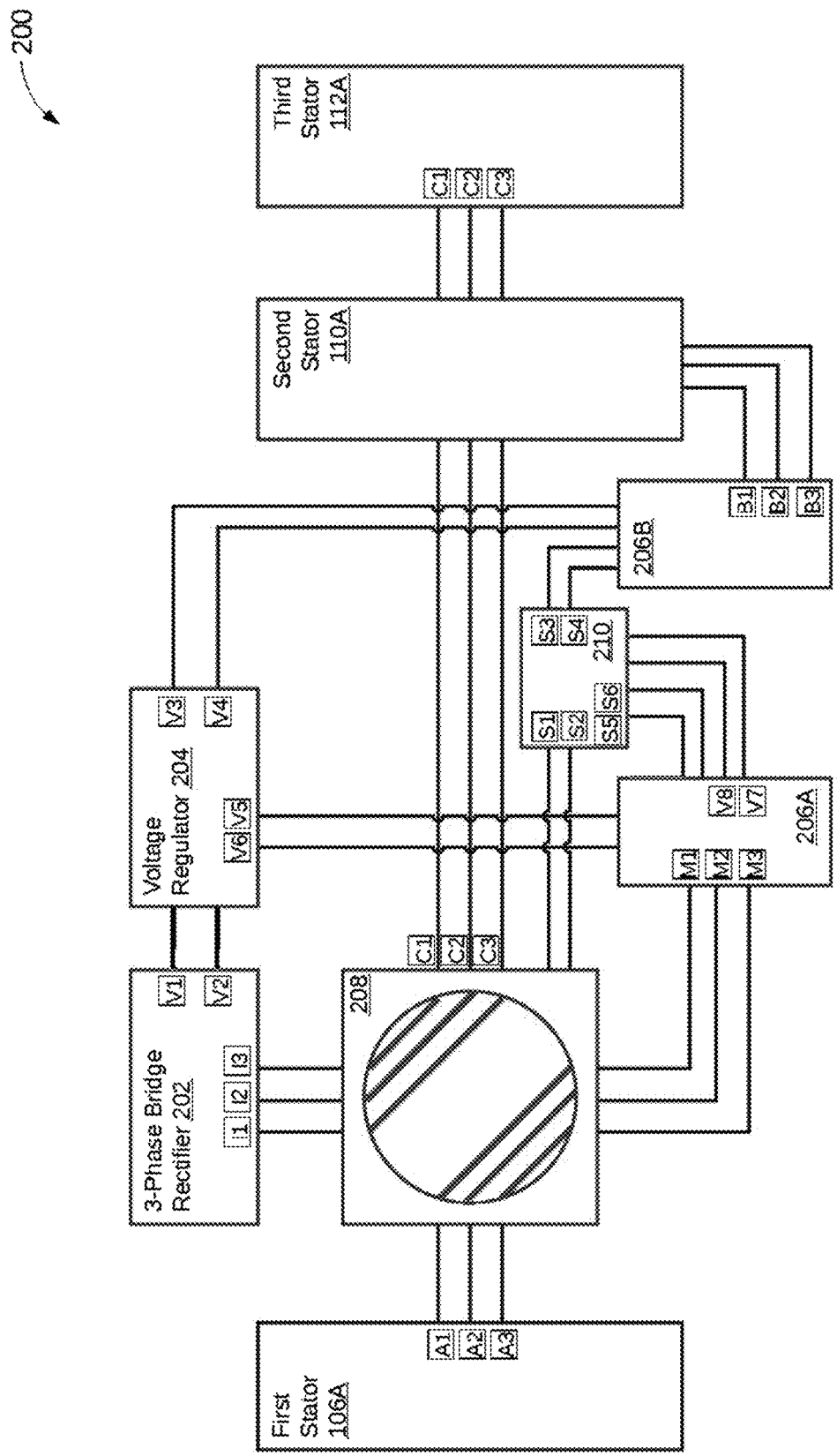
FIG. 2B illustrates a yet another schematic diagram of the CTT system with the mode switch configured in a second configuration, according to an example embodiment of the disclosure.

Referring now to FIGS. 2A-2B, schematic diagrams of the CTT system 100 are illustrated, in accordance with some embodiments. As shown, the CTT system 100 may include a rectifier 202, a voltage regulator 204, a first motor controller 206A, a second motor controller 206B, a mode switch 208, and a receiver 210. FIG. 2A illustrates a schematic diagram of the CTT system 100 with the mode switch 208 of the control module 108 configured in a first configuration; and FIG. 2A illustrates a schematic diagram of the CTT system 100 with the mode switch 208 configured in a second configuration. The control module 108 of the CTT system 100 may include the mode switch 208 that may be configured to switch the CTT system 100 between the acceleration mode and the deceleration mode, based on an instruction. For example, when configured in the first configuration, the mode switch 208 may configure the CTT system 100 in the acceleration mode. Further, when configured in the second configuration, the mode switch 208 may configure the CTT system 100 in the deceleration mode. The CTT system 100 may further include a rectifier 202, and a voltage regulator 204, first motor controller 206A, and a second motor controller 206B. For example, the rectifier 202 may be a 3-phase bridge rectifier that may receive alternating current (AC) through I1, I2, and I3 terminals and transform it into direct current (DC).

The voltage regulator 204, for example, may be coupled to the control module 108 and may be configured to receive electricity supply from the rectifier 202 and regulate the voltage of electricity supplied to the control module 108. The first motor controller 206A, for example, may be configured to receive electrical power from the voltage regulator 204 and the instruction from the receiver 210, to control the third stator 112A in the acceleration mode, or control the first stator 106A in the deceleration mode The second motor controller 206B, for example, may configured to receive electrical power from the voltage regulator 204 and the instruction from the receiver 210, to control the second stator 110A.

As shown in FIGS. 2A-2B, the voltage regulator 204 may receive direct current (DC) from the rectifier 202 through terminals V1 and V2. The voltage of this direct current may be variable. For the first motor controller 206B and the second motor controller 206B to work, a constant voltage (for example, 32 Volts(V)) may be required. If the input voltage is lower than 32 V, the voltage regulator 204 may work as a boost converter, and may increase the voltage to 32 V. If the input voltage is higher than 32 V, the voltage regulator 204 may work as a buck converter, and decrease the voltage to 32 V. Thereafter, the voltage regulator 204 may supply the regulated voltage (e.g. 32 V) to the second motor controller 206B through V3 and V4 terminals, and to the first motor controller 206A through terminals V5 and V6.

The mode switch 208 may switch the CTT system 100 between the acceleration mode and the deceleration mode, based on an instruction. To this end, the control module 108 of the CTT system 100 may include the receiver 210 that may be configured to wirelessly receive the instruction and transmit the instruction to the mode switch 208. By way of an example, the receiver may be a wired or a wireless receiver, such as a Wi-Fi receiver, a Bluetooth receiver, etc. The receiver 210 may be powered by the first motor controller 206A (via terminals V7 and V8, for example, at 5 Volts). The receiver 210 may receive a wireless signal from an operator. Further, the receiver 210 may control the mode switch 208 (through terminals S1, S2) and control the second motor controller 206B (through terminals S3, S4), and control the first motor controller 206A (through S5, S6 terminals).

As such, the first motor controller 206A may receive the electrical power from the voltage regulator 204 and a signal from the receiver 210 through terminals S5 and S6. Accordingly, the first motor controller 206A may control the third stator 112A in the acceleration mode or the first stator 106A in the deceleration mode. At the same time, first motor controller 206A may supply electricity (for example, 5 V), via terminals V7 and V8 to the receiver 210 to operate. The second motor controller 206B may receive power from the voltage regulator 204 (via terminals V3 and V4) and a signal from the receiver ("via terminals S3 and S4), to thereby control the functioning of the second stator 110A. It should be noted that the second stator 110A may operate only in the acceleration mode, i.e. low torque application. In the first configuration (i.e. the acceleration mode), the first motor controller 206A may be electrically coupled with the third stator 112A, and the second motor controller 206B may be electrically coupled with the second stator 110A. As shown in FIG. 2A, in the first configuration (i.e. the acceleration mode), the mode switch 208 may electrically couple the rectifier 202 with the first stator 106A. For example, the mode switch 208 may electrically couple the rectifier 202 with the first stator 106A, by electrically coupling terminals I1, I2, I3 of the rectifier with terminals A1, A2, A3 of the first stator 106A. Further, in the first configuration (i.e. the acceleration mode), the mode switch 208 may electrically couple the third stator 112A with the first motor controller 206A. For example, the mode switch 208 may electrically couple the third stator 112A with the first motor controller 206A, by electrically coupling terminals C1, C2, C3 of the third stator 112A with terminals M1, M2, M3 of the first motor controller 206A.

As such, in the first configuration (i.e. the acceleration mode), the first stator 106A may act as a generator and may supply generated alternating current (AC) to the rectifier 202 which may convert the alternating current (AC) into direct current (DC). Next, the direct current (DC) may enter the voltage regulator 204 which may bring the electrical supply to a constant voltage and send to the first motor controller 206A and the second motor controller 206B. Depending on the signal from the receiver 210, electrical power may be sent to the second stator 110A for low torque demand, or to the third stator 112A for high torque demand.

As mentioned above, the set of second planet gears 114C may be attached to the connecting shaft 120 which may be coupled to a one-direction mechanism that allows rotation of the connecting shaft 120 and hence the set of second planet gears 114C only in direction. In an embodiment, in the acceleration mode, the one way mechanism may allow the connecting shaft 120 to rotate in the same direction as the output shaft 118 and may restrict the rotation of the connecting shaft 120 in the opposite direction.

It should be however noted that, in other embodiments, in the first configuration (i.e. the acceleration mode), the mode switch 208 may electrically couple the second stator 110A (rather than the third stator 112A) with the first motor controller 206A.

In the second configuration (i.e. the deceleration mode), the first stator 106A may be coupled with the first motor controller 206A. As shown in FIG. 2B, in the second configuration (i.e. the deceleration mode), the mode switch 208 may electrically couple the rectifier 202 with the third stator 112A. For example, the mode switch 208 may electrically couple the rectifier 202 with the third stator 112A, by electrically coupling terminals I1, I2, I3 of the rectifier with terminals C1, C2, C3 of the third stator 112A. Further, in the second configuration (i.e. the deceleration mode), the mode switch 208 may electrically couple the first stator 106A with the first motor controller 206A. For example, the mode switch 208 may electrically couple the first stator 106A with the first motor controller 206A, by electrically coupling terminals A1, A2, A3 of the first stator 106A with terminals M1, M2, M3 of the first motor controller 206A.

When the vehicle is decelerating, the energy of the vehicle may enter the CTT system 100 via the output shaft 118 from where it may be transferred to the engine, via the input shaft 102. As such, in the deceleration mode, the third stator 112A may work as a generator and the first stator 106A as a motor. The current from the third stator 112A may enter the rectifier 202, then to the voltage regulator 204, and then to the first motor controller 206A. Thereafter, the first motor controller 206A (with the help of the receiver 210) may power the first stator 106A, in a way to maintain a gear ratio that enables the input shaft 102 to run at a constant speed while the output shaft 118 slows down.

Further, it should be noted that, in the deceleration mode, the one way mechanism may allow the connecting shaft 120 to rotate in the opposite direction as of the output shaft 118, and may restrict rotation of the connecting shaft 120 in the other direction.

Figure 3:
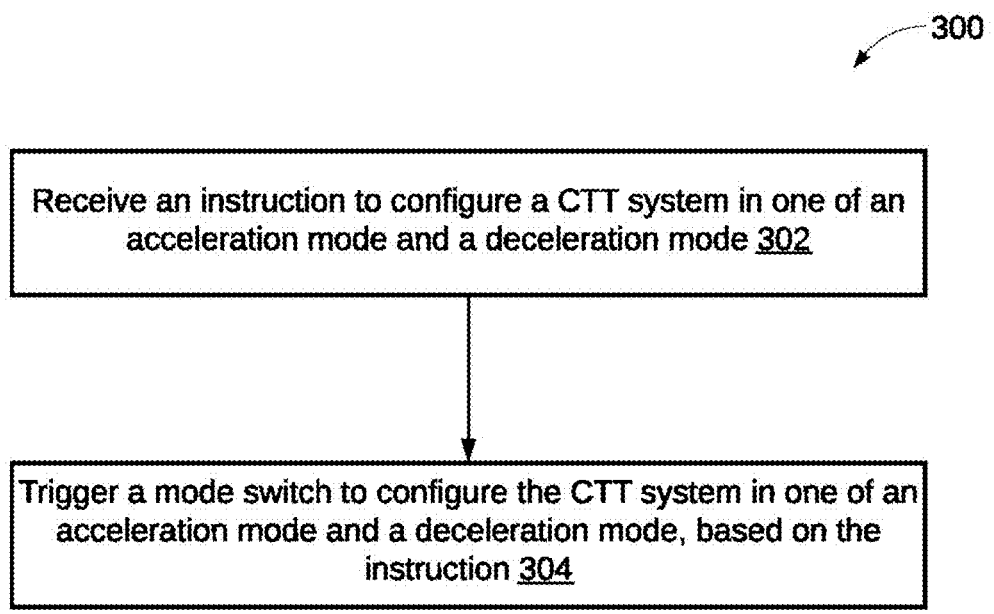
FIG. 3 illustrates a flowchart of a method, according to an example embodiment of the disclosure.

Referring now to FIG. 3, a flowchart of a method 300 is illustrated, in accordance with some embodiments of the present disclosure. The method 300, for example, may be performed by the control module 108, as explained above.

At step 302, an instruction may be received to configure the CTT system 100 in one of an acceleration mode and a deceleration mode. The CTT system 100, as explained in conjunction with FIG. 1, may include the first planetary gear assembly 104, the first electric motor-generator 106, the control module 108, the second electric motor-generator 110, the third electric motor-generator 112, and the rectifier 202. The CTT system 100 may be coupled with an input shaft 102 via the first planetary gear assembly 104. The input shaft 102 may be attached to an engine of a vehicle implementing the CTT system 100. The input shaft 102 may, therefore, supply mechanical power and rotate at a consistent speed. The first planetary gear assembly 104 may further include the first sun gear 104B and the set of first planet gears 104C. The first electric motor-generator 106 may include the first stator 106A and the first rotor 106B. The first electric motor-generator 106 may be implemented as an electromechanical device that can function both as a motor, converting electrical energy into mechanical energy, and as a generator, converting mechanical energy into electrical energy. The first rotor 106B of the first electric motor-generator 106 may be attached to the first sun gear 104B of the first planetary gear assembly 104. Further, the first stator 106A may be attached to the set of first planet gears 104C. Furthermore, the first rotor 106B may be electromagnetically coupled with the first stator 106A. The control module 108 may be electrically connected to the first stator 106A and the set of first planet gears 104C. Further, the control module 108 may be free to rotate.

The second electric motor-generator 110 may include the second stator 110A and the second rotor 110B. The second electric motor-generator 110 may also be implemented as an electromechanical device that can function both as a motor and as a generator. In an embodiment, the second rotor 110B may be fixed to a housing associated with the CTT system 100. As such, the rotation of the second rotor 110B may be fixed. The second stator 110A may be connected to each of the set of first planet gears 104C, the first stator 106A, and the control module 108. The second rotor 110B may be electromagnetically coupled with the second stator 110A. The third electric motor-generator 112 may include the third stator 112A and the third rotor 112B. The third electric motor-generator 112 may also be implemented as an electromechanical device that can function both as a motor and as a generator. In some embodiments, each of the first electric motor-generator 106, the second electric motor-generator 110, and the third electric motor-generator 112 may be a brushless motor, and therefore, may require three electrical wires to power them. The third stator 112A may be connected to the set of first planet gears 104C, the first stator 106A, the control module 108, and the second stator 110A. The set of first planet gears 104C, the first stator 106A, the control module 108, the second stator 110A, and the third stator 112A may be coupled to an output shaft 118. Furthermore, the third rotor 112B may be electromagnetically coupled with the third stator 112A.

The rectifier 202, as shown in FIGS. 2A-2B, may be electrically coupled to the control module 108, and may be configured to receive alternating current (AC) from an AC supply and convert it into direct current (DC). The control module 108 may configure the CTT system 100 in an acceleration mode and or a deceleration mode. In the acceleration mode, the first stator 106A may act as a generator to generate electric power. The generated electric power may be supplied to the rectifier 202. When the output shaft is accelerating (for example, when the vehicle starts to move from being stationary), the first stator 106A (i.e. the first electric motor-generator 106) may act as generator to generate electric power. As such, the first rotor 106B is rotated by the mechanical power from the input shaft 102, to thereby configure the first electric motor-generator 106 as generator to generate electrical power. The rectifier 202 may convert the alternating current (AC) into direct current (DC) that may be supplied to a voltage regulator 204. The voltage regulator 204 may bring the current to a constant voltage and send the current to the first motor controller 206A and the second motor controller 206B. Depending on a signal from the receiver 210, power may be sent to the second stator 110A or the third stator 112A. In particular, the power may be sent to the second stator 110A for low torque demand, and to the third stator 112A for high torque demand.

During the deceleration mode, energy may be supplied to the CTT system 100 of the vehicle via the output shaft 118 and then to the engine via the input shaft 102. The mode switch 208 may switch terminals. In the deceleration mode, the third stator 112A may act as a generator to supply electric power to the rectifier 202. The rectifier 202 may in turn supply the generated electric power to the first stator 106A. In other words, when the output shaft is decelerating (for example, during braking of the vehicle), the third stator 112A (i.e. the third electric motor-generator 112) may act as generator to generate electric power. As such, the third rotor 112B is rotated by the mechanical power from the output shaft 118, to thereby configure the third electric motor-generator 112 as generator to generate electrical power. Further, in the deceleration mode, the first stator 106A may act as a motor. Therefore, the first stator 106A is supplied electrical power to cause rotation of the first rotor 106B. As a result, a constant speed of the input shaft 104 is maintained during the deceleration of the output shaft 118. The current generated from the third stator may enter the rectifier 202, then to the voltage regulator 204, and finally to the first motor controller 206A. The first motor controller 206A, with the help of the receiver 202 may power the first stator 106A so as to maintain proper gear ratio, so that the input shaft 102 may have a constant speed while the output shaft 118 slows down.

At step 304, the mode switch 208 may be triggered to configure the CTT system 100 in one of an acceleration mode and a deceleration mode, based on the instruction. In the acceleration mode, the first stator 106A may act as a generator to generate electric power that is supplied to the rectifier 202. In the deceleration mode, the third stator 112A may act as a generator to supply electric power to the rectifier 202. The rectifier 202 may supply electric power to the first stator 106A that acts as a motor to maintain a constant speed of the input shaft 102 during the deceleration of the output shaft 118.

Although the above detailed descriptions relate to specific preferred embodiments as the inventor presently contemplates, it will be understood that the invention in its broad aspects includes mechanical, chemical, and functional equivalents of the elements described herein. Various details of design and construction may be modified without departing from the true spirit and scope of the invention which is set forth in the following claims. Other embodiments, which will be apparent to those skilled in the art and which practice the teachings herein set forth, are intended to be within the scope and spirit of the invention.

What is claimed is:

1. A Continuous Torque Transmission (CTT) system comprising:
   a first planetary gear assembly comprising:
   a first ring gear attached to an input shaft rotating at a consistent speed;
   a first sun gear attached to a first rotor; and
   a set of first planet gears, each engaging with the first ring gear and the first sun gear,
   a first electric motor-generator comprising:
   a first stator attached to the set of first planet gears; and
   the first rotor electromagnetically coupled with the first stator;
   a control module electrically connected to the first stator and the set of first planet gears;
   a second electric motor-generator comprising:
   a second stator connected to the set of first planet gears, the first stator, and the control module; and
   a second rotor electromagnetically coupled with the second stator;
   a third electric motor-generator comprising:
   a third stator connected to the set of first planet gears, the first stator, the control module, and the second stator, wherein the set of first planet gears, the first stator, the control module, the second stator, and the third stator are coupled to an output shaft; and
   a third rotor configured to electromagnetically coupled with the third stator;
   a rectifier electrically coupled to the control module and configured to receive alternating current (AC) and convert into direct current (DC);
   wherein the control module is to configure the CTT system in one of an acceleration mode and a deceleration mode,
   wherein, in the acceleration mode,
   the first stator acts as a generator to generate electric power that is supplied to the rectifier, and
   wherein, in the deceleration mode,
   the third stator acts as a generator to supply electric power to the rectifier, and the rectifier supplies electric power to the first stator that acts as a motor to maintain constant speed of the input shaft during the deceleration of the output shaft.

2. The CTT system of claim 1, wherein the second rotor is fixed to a housing associated with the CTT system to fix rotation of the second rotor.

3. The CTT system of claim 1 further comprising:
   a second planetary gear assembly comprising:
   a second ring gear attached to the set of first planet gears, the first stator, the control module, the second stator, and the third stator, and coupled to the output shaft;
   a second sun gear attached to the third rotor; and
   a set of second planet gears, each engaging with the second ring gear and the second sun gear.

4. The CTT system of claim 3, wherein the set of second planet gears is attached to a connecting shaft, wherein the connecting shaft is configured to rotate in one direction.

5. The CTT system of claim 3 further comprising:
   a first spur gear attached to the second ring gear, wherein the first spur gear is further coupled to the output shaft.

6. The CTT system of claim 5, wherein a second spur gear and a third spur gear are attached to a common connecting shaft (E) and a fourth spur gear (D) is attached to the output shaft, the fourth spur gear offset from the second spur gear and the third spur gear and engaging with the third spur gear.

7. The CTT system of claim 1, wherein, when the output shaft is stationary:
   the rotation of the input shaft causes the rotation of the first sun gear via the first ring gear and the set of first planet gears, to induce maximum voltage in the first stator,
   revolution of the set of first planet gears is constrained, and
   the control module ceases the supply of electrical power to the second stator or the third stator.

8. The CTT system of claim 1, wherein, when the output shaft is in the acceleration mode from being stationary:
   for a high torque application, the control module directs electrical power to the third stator, or for a low torque application, the control module directs electrical power to the second stator.

9. The CTT system of claim 1, wherein, when the output shaft rotates at a medium speed range:
   the torque generated at the output shaft is partly from the input shaft and partly from one of the second stator and the third stator.

10. The CTT system of claim 1, wherein, when the output shaft rotates at a high-speed range:
    the first sun gear rotates at a lower speed, the first rotor rotating at the lower speed induces a low voltage in the first stator, and the control module causes the supply of electrical power to one of the second stator and the third stator.

11. The CTT system of claim 1, wherein, when the output shaft rotates at a high-speed range and is in the deceleration mode, the output shaft rotates the third stator and the second stator, and the control module causes the supply of electrical power to the first stator.

12. The CTT system of claim 1, wherein the control module comprises:

a mode switch configured to switch the CTT system between the acceleration mode and the deceleration mode, based on an instruction.

13. The CTT system of claim 12, wherein the control module further comprises a receiver configured to wirelessly receive the instruction and transmit the instruction to the mode switch.

14. The CTT system of claim 1 further comprising a voltage regulator coupled to the control module, the voltage regulator configured to receive electrical supply from the rectifier and regulate voltage of electricity supplied to the control module.

15. The CTT system of claim 1, wherein the control module comprises:

a first motor controller configured to receive electrical power from a voltage regulator and the instruction from a receiver, to control the third stator in the acceleration mode, or control the first stator in the deceleration mode; and a second motor controller configured to receive electrical power from the voltage regulator and the instruction from the receiver, to control the second stator.

16. The CTT system of claim 15, wherein, in the acceleration mode, the first motor controller is coupled with the third stator and the second motor controller is coupled with the second stator wherein, in the deceleration mode, the first stator is coupled with the first motor controller and the second stator is coupled with the second motor controller.

17. The CTT system of claim 4, wherein, in the acceleration mode, the connecting shaft rotates only in the same direction as the output shaft, and wherein, in the deceleration mode, the connecting shaft rotates only in the opposite direction as of the output shaft.

\* \* \* \* \*